(12) United States Patent
Durham

(10) Patent No.: US 11,139,981 B2
(45) Date of Patent: Oct. 5, 2021

(54) MESSAGE AUTHENTICATION CODE (MAC) BASED COMPRESSION AND DECOMPRESSION

(71) Applicant: Intel Corporation, Santa Clara, CA (US)

(72) Inventor: David M. Durham, Beaverton, OR (US)

(73) Assignee: INTEL CORPORATION, Santa Clara, CA (US)

(*) Notice: Subject to any disclaimer, the term of this patent is extended or adjusted under 35 U.S.C. 154(b) by 385 days.

(21) Appl. No.: 16/370,108

(22) Filed: Mar. 29, 2019

(65) Prior Publication Data

US 2019/0379547 A1    Dec. 12, 2019

(51) Int. Cl.
*H04L 9/32* (2006.01)
*H04L 29/06* (2006.01)

(52) U.S. Cl.
CPC .......... *H04L 9/3242* (2013.01); *H04L 63/123* (2013.01)

(58) Field of Classification Search
CPC ..... H04L 9/3242; H04L 63/123; H04L 69/04; H04L 9/0643
USPC ........................................................ 713/168
See application file for complete search history.

(56) References Cited

U.S. PATENT DOCUMENTS

| | | | | |
|---|---|---|---|---|
| 7,714,747 B2* | 5/2010 | Fallon | ................. | H03M 7/3059 341/51 |
| 9,159,419 B2* | 10/2015 | Nellans | ............ | G11C 11/40615 |
| 9,792,229 B2 | 10/2017 | Kishinevsky | | |
| 9,990,249 B2* | 6/2018 | Durham | .............. | G06F 12/0886 |
| 2009/0190760 A1* | 7/2009 | Bojinov | ................ | G06F 3/0623 380/269 |
| 2011/0154059 A1* | 6/2011 | Durham | ................. | G06F 21/72 713/190 |
| 2015/0334033 A1* | 11/2015 | Wang | ..................... | H04L 69/22 370/389 |
| 2016/0188474 A1* | 6/2016 | Wang | ................. | G06F 9/45558 711/119 |
| 2017/0024568 A1* | 1/2017 | Pappachan | .............. | G06F 21/64 |
| 2017/0083724 A1* | 3/2017 | Chhabra | ............. | G06F 12/1408 |
| 2017/0185529 A1 | 6/2017 | Chhabra | | |
| 2017/0185532 A1* | 6/2017 | Durham | ................. | G06F 21/00 |

(Continued)

*Primary Examiner* — Shahriar Zarrineh
(74) *Attorney, Agent, or Firm* — Jaffery Watson Mendonsa & Hamilton LLP

(57) ABSTRACT

Embodiments are generally directed to message authentication code (MAC) based compression and decompression. An embodiment of an apparatus includes one or processors to process data; and a computer memory; wherein the one or more processors are to perform compression of a fixed transmission or storage unit, the transmission or storage unit including multiple slots, the compression of the transmission or storage unit including the one or more processors to calculate a MAC for data in the transmission or storage unit, determine whether a special value is present in any slot of the transmission or storage unit, and upon determining that the special value is present in a respective slot of the transmission or storage unit, remove the special value from the transmission or storage unit, shift remaining data of the transmission or storage unit to provide room in a first slot the transmission or storage unit, and insert the MAC in the first slot to generate a compressed transmission or storage unit.

21 Claims, 8 Drawing Sheets

(56) References Cited

U.S. PATENT DOCUMENTS

| | | | |
|---|---|---|---|
| 2017/0285976 A1* | 10/2017 | Durham | G06F 12/1408 |
| 2017/0289068 A1* | 10/2017 | Palermo | H04L 49/70 |
| 2018/0091308 A1 | 3/2018 | Durham | |
| 2019/0042359 A1 | 2/2019 | Durham | |
| 2019/0042496 A1* | 2/2019 | Peffers | G06F 13/1673 |
| 2019/0045030 A1* | 2/2019 | Kounavis | H04L 63/123 |

* cited by examiner

MESSAGE AUTHENTICATION CODE (MAC) BASED COMPRESSION AND DECOMPRESSION

TECHNICAL FIELD

Embodiments described herein generally relate to the field of electronic devices and, more particularly, message authentication code (MAC) based compression and decompression.

BACKGROUND

In computer operations, a message authentication code (MAC, or MAC code) is commonly used to authenticate a message. The MAC is a block of text generated via one of multiple available algorithms. The recipient of the message can utilize the MAC to ensure that the message hasn't been corrupted or modified by another party.

In some technologies the MAC is further applied to for cryptography purposes to provide data against access by unauthorized persons. The cryptographic MAC thus provides a powerful and necessary tool in maintaining integrity and restricted access for data in computing systems.

However, the MAC will inevitably require a certain amount of data space in storage and transmission, and thus adds to the overhead of computing operations, particularly when the unit of data space is fixed/invariable (such as a cacheline). If the underlying data requires compression to make space for the MAC, this further increases the overhead cost as compression metadata is then added to the MAC data to provide the compression, integrity, and access protections needs of a computing system.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
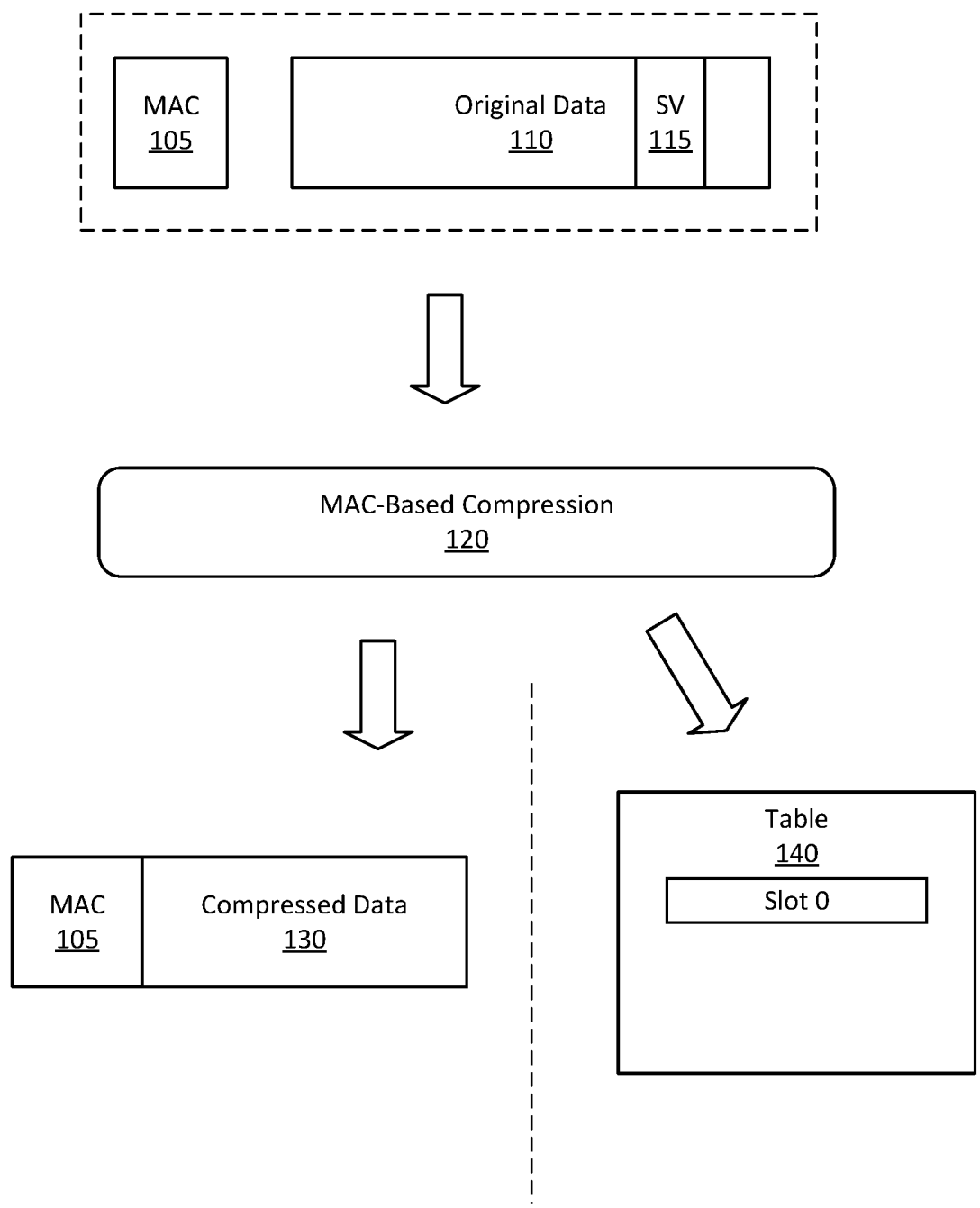
FIG. 1 is an illustration of MAC-based compression technology in an apparatus, system, or process according to some embodiments.

Embodiments described herein are directed to message authentication code (MAC) based compression and decompression.

As used here, a Message Authentication Code (MAC) means any data or information generated to authenticate a message. A MAC may include, but is not limited to, an Integrity Check Value (ICV).

Message Authentication Codes (MACs), such as the SHA3 (Secure Hash Algorithm 3 of the Secure Hash Algorithms of the National Institute of Standards (NIST)) based KMAC (Keccak Message Authentication Code), are essential for data integrity, which may include cryptographic data integrity, and access control. However, conventionally MACs do not provide any assistance in the compression of data, and instead may increase difficulty or reduce efficiency by requiring additional data for memory storage and data transmission for the MAC.

In some embodiments, the properties of a cryptographic MAC are applied to reconstruct message contents using only limited or zero compression metadata by using the MAC to determine when a message is correctly decompressed through trial and error. By minimizing the amount of required metadata, an apparatus, system, or process can provide secure and efficient memory and storage integrity technologies.

In some embodiments, compression is used to make space for a MAC, and, in a following decompression operation, the MAC is then used to derive information needed to reconstruct compressed messages (specifically fixed size memory lines and storage sectors) instead of requiring the use of additional compression metadata. This technology may be referred to herein as MAC-based compression and decompression.

Prior technologies require storage of both a cryptographic MAC and compression metadata to provide both data integrity/accessibility and compression services. When the purpose of data compression is to fit a MAC within a fixed transmission or storage unit (such as a cacheline), additional compression is needed for the compression metadata. In some embodiments, an apparatus, system, or process is to apply the MAC data together with an operation to test potential data structures (which may commonly be referred to as a "trial and error" approach) and reconstruct a compressed message/memory content without requiring some or all of the metadata that would be required in conventional technology. In general, any lossless compression technique can be applied and attempted, using the MAC as the discriminator for determining when the correct decompression method was used upon the decompressed data matching the MAC value. The MAC-based compression technology allows more MAC data to fit within the same cacheline constraints as the data it protects, thus improving performance and lowering memory overheads due to fetching the extra data from memory. When compression is impossible because the data is incompressible (e.g. fully random data sequences), data displaced by a MAC value may be stored in an overflow region of memory.

To save on metadata to reconstruct compressed data, MAC-based compression includes use of the MAC data to reconstruct the original data sequence based upon trial and error of certain known data structures. For example, it may be known that a certain word (for example, 0x0000 may be commonly present) repeats 4 times in the uncompressed data. In some embodiments, a MAC-based compression and decompression apparatus, system, or process includes guessing the repeating value and then, based on the knowledge of the repetition of the value, using the MAC value to determine when the data sequence is correctly reconstructed by attempting all possible combinations and testing the MAC against each combination. In some embodiments, the MAC-based compression operation includes knowledge or precomputation of all possibilities for all positions to verify that there are no known MAC collisions for any incorrect reconstruction, and, if there are, to fall back to an alternative operation for storage of the data, which includes removal and storage of a portion of the original data (such as a first slot of data), wherein such portion of data may be held in a table. Given the decompression operation is the inverse of the compression operation, the MAC may be tested by trying the message reconstruction process in sequence to determine that none of the prior sequential tests would result in a collision (e.g. first testing for the all combinations of a repeating 0x0000 value word, then testing for all possible combinations of the 0x11111 word, and so on, in the same order as decompression), thus, limiting the number of collision tests required for MAC-based compression.

In some embodiments, the MAC-based compression and decompression may be applied to save space, time, and cost as it reduces or eliminates the need for metadata used to reconstruct compressed messages/memories, while enabling improved security with cryptographic memory integrity. The technology may be applied to any first storage or transmission unit. Storage units may include, for example, any disk drives, SSDs (Solid State Drive), NVRAM (Non-Volatile Random Access Memory), or other storage that has fixed sized data transmission sizes, such as a cacheline, page, segment, etc., or fixed size communication protocols that require the addition of integrity.

FIG. 1 is an illustration of MAC-based compression technology in an apparatus, system, or process according to some embodiments. In some embodiments, a cryptographic MAC is generated for original data 110, the original data 110 being a cacheline or other fixed transmission or storage unit having a certain fixed length and number of regular intervals, which may be referred to as slots, for data. In some embodiments, there is a determination that the original data 110 includes a certain special value (SV) 115, or a set of possible values, aligning to a slot (or other regular interval) and thus may be compressed by a MAC based compression operation 120.

In some embodiments, upon determining that the special value 115 is present in the original data 110, the special value 115 is removed from the original data and the remaining data is concatenated together to make room for the MAC value (such as in a first slot (Slot 0) of the data), resulting in compressed data 130 with the MAC value 105. In this manner, the data compression process may be implemented without adding any compression metadata to the compressed data as this will not be required for performance of the MAC-based decompression operation, as illustrated in FIG. 2.

If the special value 115 is not present in the original data 110, then the MAC-based compression operation 120 is not applicable (i.e., the data is not compressible by this method), and instead a portion of the original data is removed (such as the Slot 0 data), and a table 140 in memory is updated to include the Slot 0 data. Alternatively, some embodiments may choose to store the MAC value in a separate memory table instead. The slots/entries of the table may be indexed based on the memory address of the corresponding cacheline. For example, if the table is located in a region at the end of memory, the first table entry would correspond to the cacheline with address 0x . . . 0000, the second table entry would correspond to the cacheline with address 0x . . . 0001, and so on, with the table size based on the number of possible cachelines times the size of the slot/entry.

In some embodiments, the compression technology illustrated in FIG. 1 may further provide for verifying that no MAC collisions are possible in decryption with the placement of the MAC 105 in the compressed data 130. For example, after compressing and placing the MAC, an embodiment may attempt the inverse decompression operation to verify that the original message/data is correctly reconstructed. If a MAC collision would cause incorrect decompression of the data, then the original data is modified such that the MAC is a reserved value indicating a collision scenario, and the actual MAC is stored in a separate MAC table. This operation is further illustrated in FIG. 5.

Figure 2:
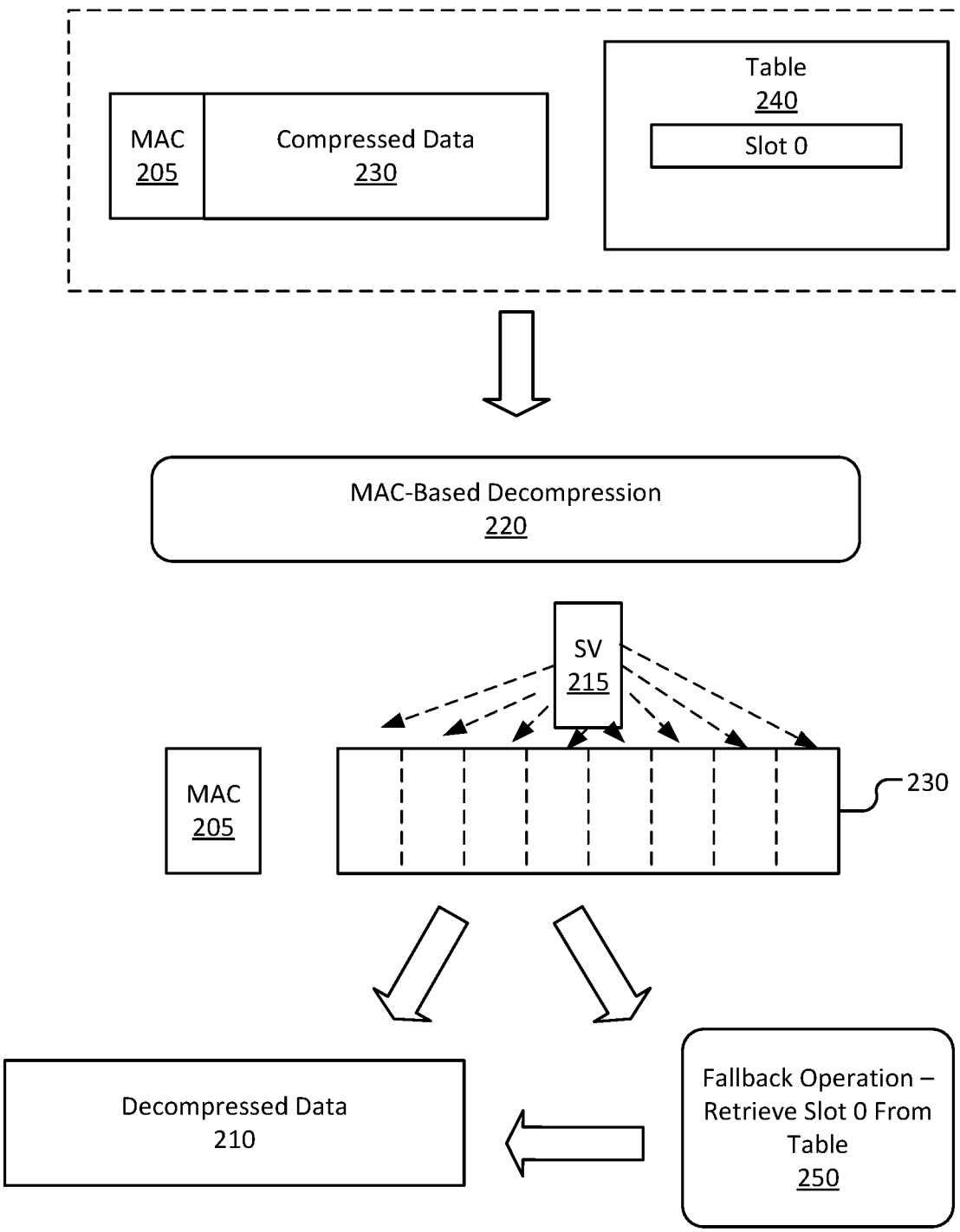
FIG. 2 is an illustration of MAC-based decompression technology in an apparatus, system, or process according to some embodiments.

FIG. 2 is an illustration of MAC-based decompression technology in an apparatus, system, or process according to some embodiments. In some embodiments, following successful application of the MAC-based compression operation illustrated in FIG. 1, a MAC-based decompression operation may be performed to generate decompressed data without requiring any compression metadata representing how to reconstruct a compressed message.

As illustrated in FIG. 2, a compressed data value 230 having a known fixed length and number of slots includes a MAC 205 in a particular location, such as in a first slot (Slot 0) of the compressed data. The compressed data may comprise a compressed cacheline. A memory may also include a table 240, which may include one or more entries from uncompressed data elements.

In some embodiments, the MAC-based decompression 220 is to remove and set aside (e.g. in a register) the MAC value and then to apply the MAC 205 to determine when the compressed data 230 has been reconstructed to its original state, as the decompressed data 210, by trial and error. The apparatus, system, or process is to apply the special value 215 (or values) in each available slot of the data 230 until the MAC matches the reconstructed data.

If after a prescribed set of strategies to reconstruct the data all fail (none of the attempted reconstructions match the original MAC), only then is an additional memory load required to fetch the full data (i.e., uncompressible data) and verify the MAC. This is illustrated as the fallback operation 250, which includes retrieval of Slot 0 data from the table 240.

If none of these attempts (the values with insertion of the special value 215 in each slot, and the fallback operation 250) match the MAC on a memory load, then an integrity error is generated (e.g. the cacheline is poisoned, poison bit is set). This may indicate to the processor or software an error condition for the affected cacheline. This is further illustrated in FIG. 6.

Figure 3A:
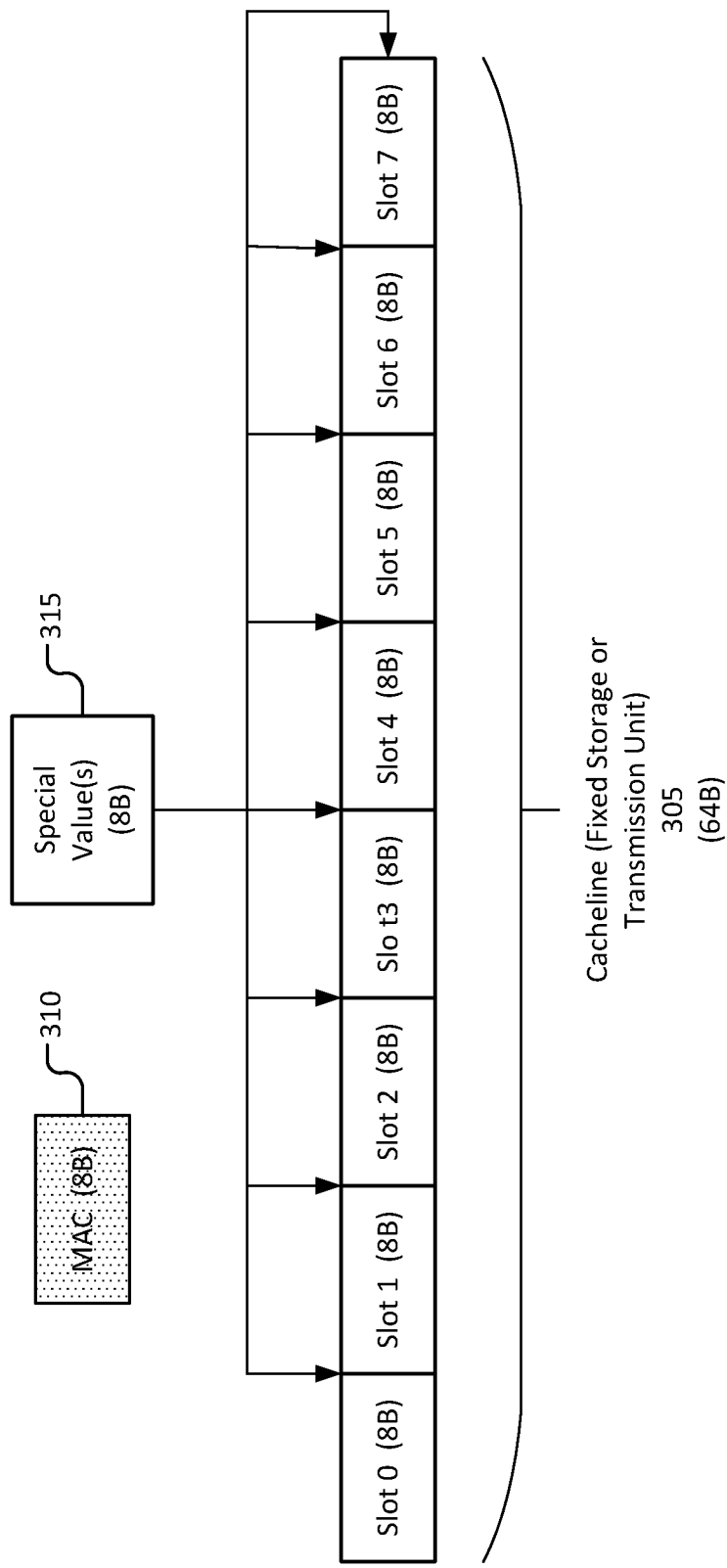
FIG. 3A is an illustration of an exemplary cacheline for application of MAC-based compression technology in an apparatus, system, or process according to some embodiments.

FIG. 3A is an illustration of an exemplary cacheline for application of MAC-based compression technology in an apparatus, system, or process according to some embodiments. As shown in FIG. 3A, a cacheline 305 (or other fixed storage or transmission unit) stored in memory in this example is 64B, with the cacheline including a certain number of slots (or positions at regular intervals), such as 8 slots of 8 B, shown as slots Slot 0 through Slot 7. However, embodiments are not limited to any particular size of cacheline 305, or to any particular number or size of slots in the cacheline 305.

As further shown in FIG. 3A, a MAC 310 is calculated for the full cacheline value, wherein the MAC 310 may in some embodiments be a cryptographic MAC 310. In some embodiments, a MAC-based compression process includes determining whether a particular special value 315 is present in any of the slots of the cacheline. If so, then the special value may be removed from the respective slot of the cacheline, with the remaining slots to be concatenated together to allow insertion of the MAC into one of the slots (such as Slot 0) of the cacheline 305.

In the example illustrated in FIG. 3A, it is assumed that there is a certain special value 315, the special value being an 8 B (64-bit) value in this example, that commonly occurs in cachelines. For example, the value of zero is very common in data, with ~50% of cachelines containing a string of zero bytes. The special value 315 may occur in any of the slots of the cacheline 305, or may not occur at all in certain cases. It is noted that, while the examples illustrated and described herein recognize a single special value, there may be instances in which there are more than one special value, although the recognition of multiple special values in MAC-based compression may reduce efficiency of operation.

Figure 3B:
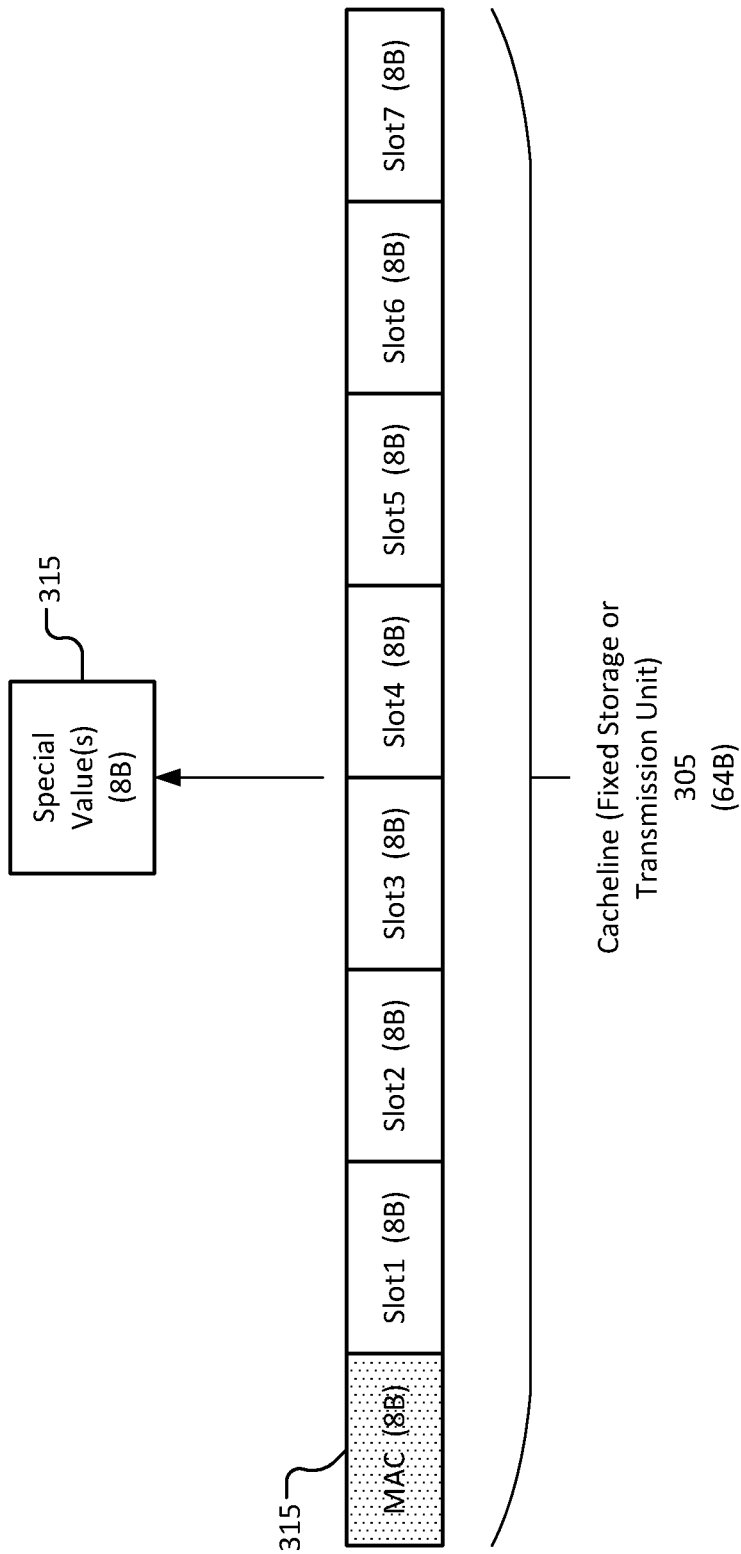
FIG. 3B is an illustration of an exemplary cacheline subsequent to application of MAC-based compression technology in an apparatus, system, or process according to some embodiments.

FIG. 3B is an illustration of an exemplary cacheline subsequent to application of MAC-based compression technology in an apparatus, system, or process according to some embodiments. In some embodiments, in order to compress the cacheline 305, the MAC value 310 calculated over the full cacheline is to be inserted into the cacheline. To make room for the MAC value 310 in the cacheline 305, the apparatus, system, or process has searched for the special value 315 in the slots of the cacheline 305.

As illustrated in FIG. 3B, upon the special value being identified in any of the slots, the occurrence of the special value 315 is removed from the cacheline 305, thus truncating the cacheline to make room for the MAC value 315 that was calculated over the full cacheline (including the special value in its original location). In this illustration the special value 315 may have been present in any of the slots of the cacheline 315. The remaining slots may be concatenated together (if necessary, i.e., if the special value was in an interior slot of the cacheline) and shifted to provide room for the MAC 315. Other embodiments may reduce the size of the special value (or values), such as 2 bytes, and find the value within multiple 2 byte slots, adding up to a number of slots with the repeated value to equal the size of the MAC (e.g. 4×2 byte slots for an 8 byte MAC). In this case the 4 repeated values could be removed and the remaining slots concatenated together to create space for the MAC. Note that any combination of one or more special values can be used with multiple slot locations with the remaining slots concatenated together to make room for the MAC.

In some embodiments, the apparatus, system, or process may optionally encrypt the data (which may include the MAC in the ciphertext in some implementations), e.g. as specified for MKTME, and then store (write) the data to external memory, cryptographically protected, so that it can maintain confidentiality and integrity while the data is outside of the main processor package in external memory (such as NVRAM (Non-Volatile Random Access Memory), DRAM (Dynamic Random Access Memory), or other memory).

Figure 4:
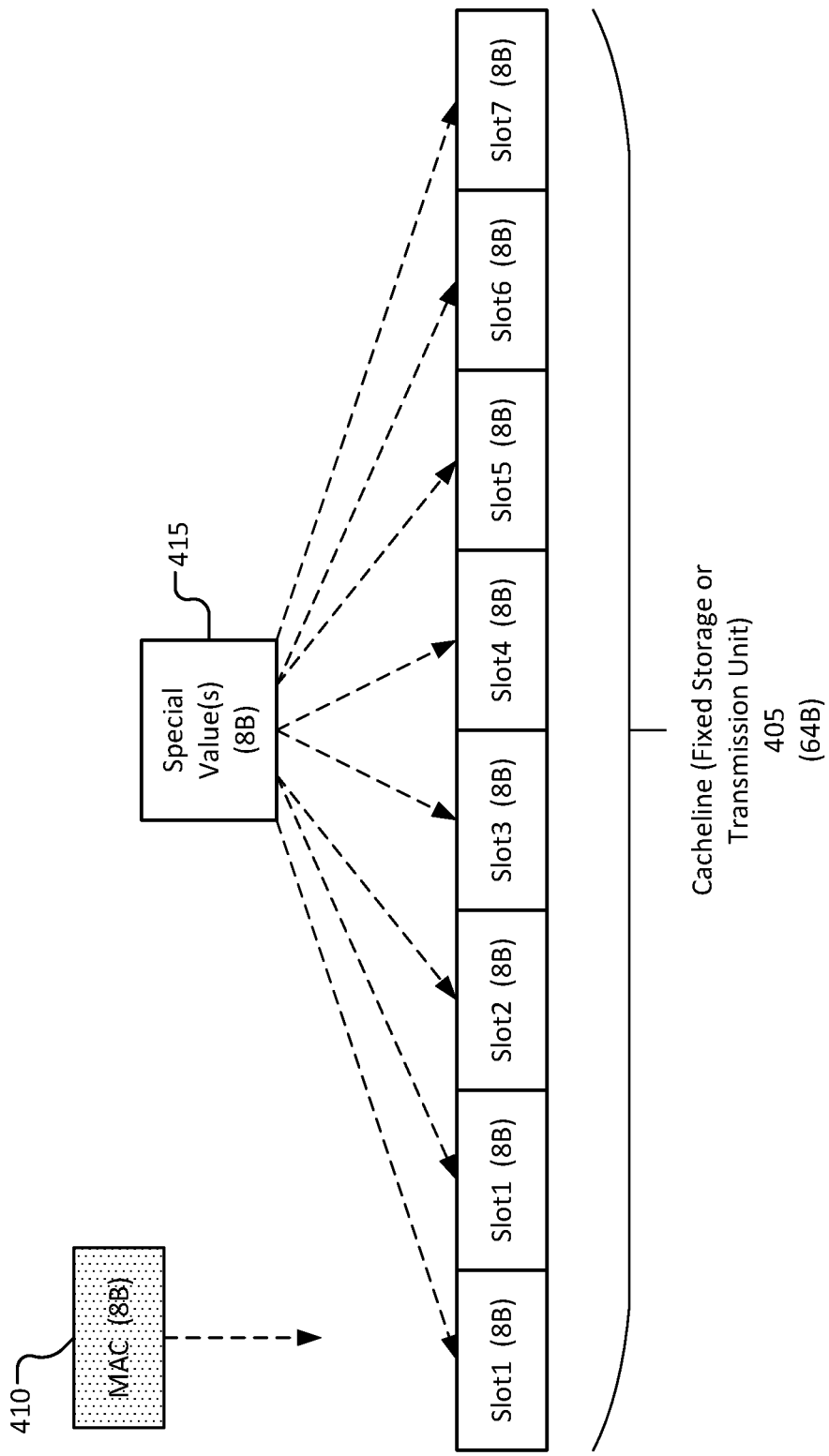
FIG. 4 is an illustration of an exemplary cacheline subsequent to application of MAC-based decompression technology in an apparatus, system, or process according to some embodiments.

FIG. 4 is an illustration of an exemplary cacheline subsequent to application of MAC-based decompression technology in an apparatus, system, or process according to some embodiments. In some embodiments, in order to decompress a compressed cacheline such as cacheline 305 illustrated in FIG. 3B, the MAC value 410 that was calculated over the full cacheline is removed and set aside from the cacheline 405. Depending on the special value(s)/slot size and the MAC size, the decompression may attempt all combinations of the special value(s) and slot locations until the MAC value matches one of the tested combinations, or, if no attempts are successful, generate an error/poisoned cacheline.

In some embodiments, the apparatus, system, or process is to determine which slot position (if any) results in matching the MAC value 410 through a trial and error process. As further illustrated in FIG. 6, the special value 415 is to be inserted sequentially into each slot of the cacheline 405, and a new MAC value is calculated. If the new MAC value matches the previous MAC value 410, then the cacheline 405 has been reconstructed. If not, the process continues until each of the possible locations for the special value have been attempted and calculated. Some embodiments may attempt combinations and tests in parallel, in order to improve performance, as each test is independent.

Figure 5:
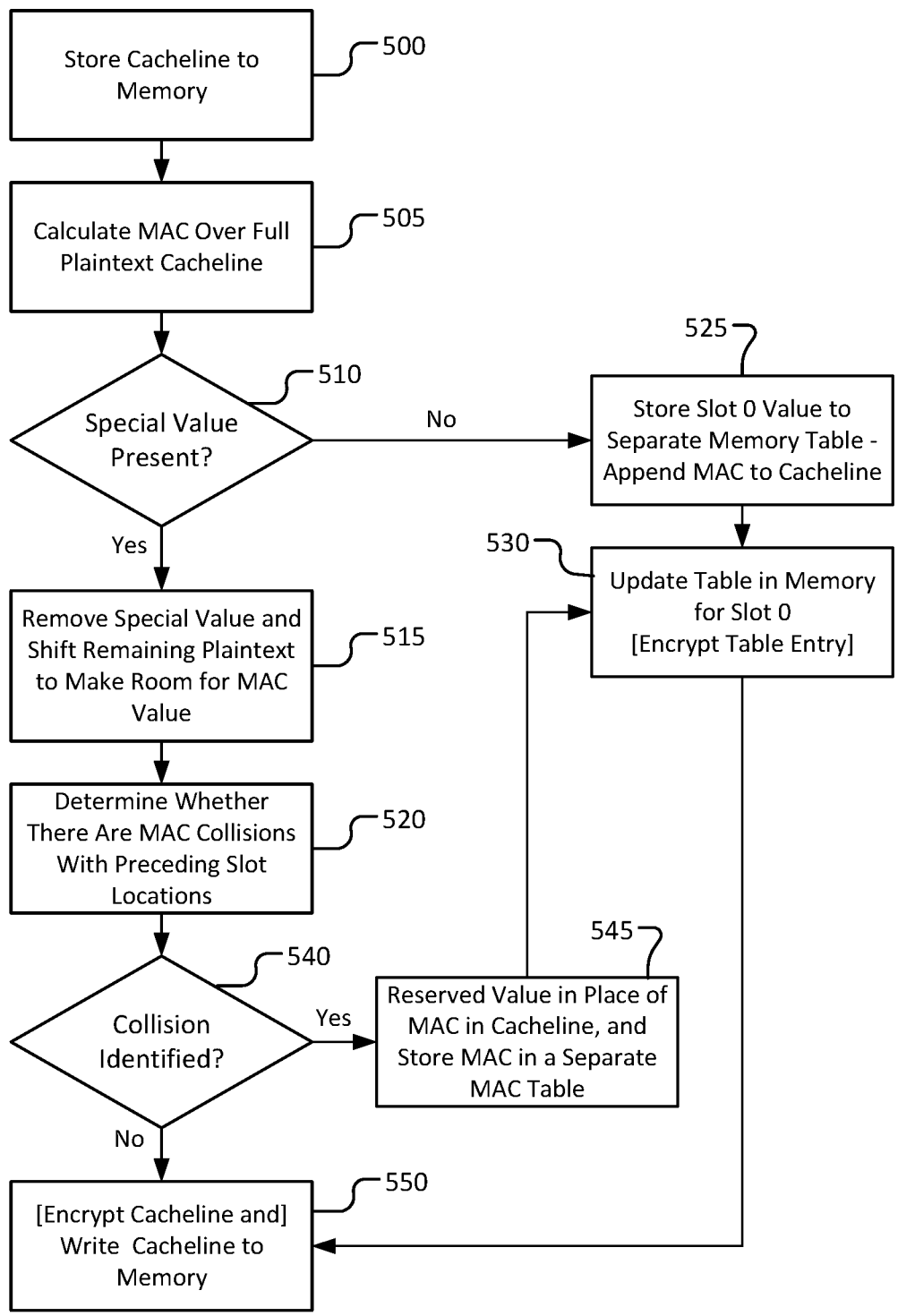
FIG. 5 is a flow chart to illustrate a process for MAC-based compression of a cacheline according to some embodiments.

FIG. 5 is a flow chart to illustrate a process for MAC-based compression of a cacheline according to some embodiments. As shown in FIG. 5, a process may include storing a particular cacheline (or other data structure) to memory 500, and calculating a MAC over the full plaintext cacheline. For example, the MAC may be the MAC 310 that is calculated over cacheline 305 as illustrated in FIGS. 3A and 3B, with the cacheline being, for example, 64 bytes and having 8 slots of 8 bytes (or other size and number of slots in a different implementation).

The process continues with a determination whether a particular special value that may commonly occur in cachelines, such as the special value 315 (or values) illustrated in FIGS. 3A-3B, is present in the cacheline 510. If not, then the Slot 0 value is stored in a separate memory table (a first table) and the MAC is appended to the cacheline 525. The memory table is updated for Slot 0, and the table entry may optionally be encrypted 530. (While this example uses Slot 0 as for the placement of the MAC value for simplicity, embodiments are not limited to any particular slot location.)

If the special value is present in any of the slots of the cacheline 510, the special value is removed from the cacheline and the remaining plaintext is shifted (which may include concatenation of remaining data) to make room for the MAC value 515. For example, if the special value was identified in Slot 3 of the cacheline, then the data found in Slot 0 to Slot 2 would be concatenated with the data found in Slot 4 to Slot 7, and the data is then shifted to make room for the MAC value.

In some embodiments, the process includes a determination whether there are any MAC collisions that would occur with the preceding slot locations 520, i.e., the process flow is to verify whether or not there are any alternative reconstructions of the cacheline that would result in a same MAC value. If no collisions are identified 540, then the modified cacheline is optionally encrypted, and the modified cacheline is written to memory 550. This is equivalent to creating a compressed cacheline with the MAC value, and then attempting the decompression operation to verify the original data was reconstructed. Note that multiple special values can be attempted by repeating the compression or decompression flows for each possible special value.

If a collision is identified 540, a reserved value is stored in place of the MAC in the cacheline, and the MAC is stored in a separate MAC table (a second table) 545. In one example, if the special value was actually located at the end of the cacheline at slot 7 and the MAC would also match a reconstruction where the special value was located at another location, such as at the beginning of the cacheline at slot 0, then the MAC should be set to a reserved value (e.g. 0, or any other reserved value) and the real MAC value stored in the separate table. The reserved value (0 in this example) indicates the MAC should be retrieved separately from the MAC table as there was a collision with an alternative reconstruction of the data. The process may proceed to updating the memory table for Slot 0 530. If the MAC happens to calculate to the reserved value, then the same procedure would be followed, and the reserved value MAC would be stored in both the MAC table and the memory table locations. (However, this is a corner case.) The process then proceeds with the modified cacheline being optionally encrypted, and being written to memory 550.

Figure 6:
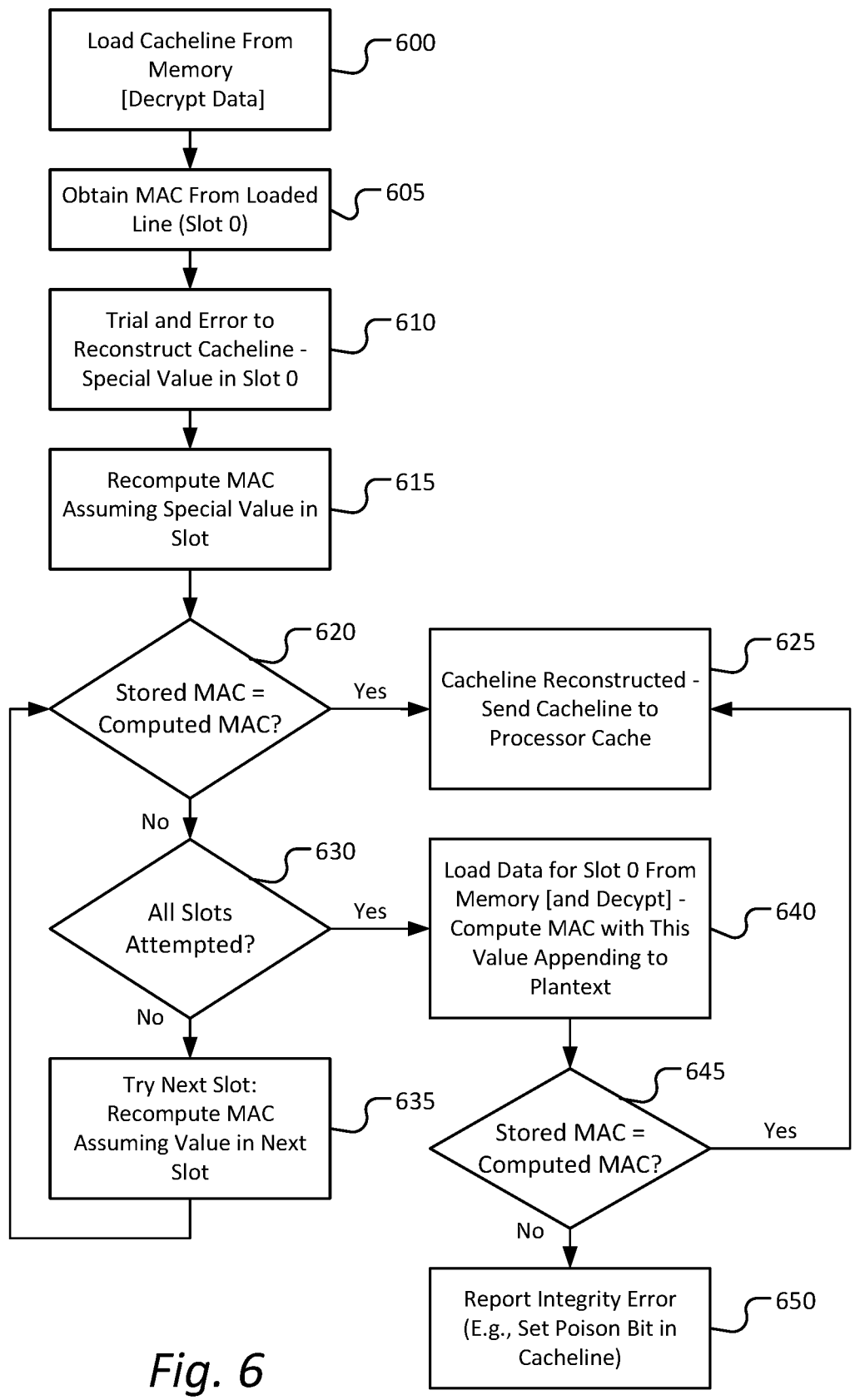
FIG. 6 is a flow chart to illustrate a process for MAC-based compression of a cacheline according to some embodiments.

FIG. 6 is a flow chart to illustrate a process for MAC-based compression of a cacheline according to some embodiments. As shown in FIG. 6, a process may include loading a particular modified cacheline (or other fixed storage or transmission unit) from memory 600. In some implementations the cacheline is encrypted, and the data is then decrypted for processing. In some embodiments, a stored MAC value is obtained from the loaded cacheline, such as from the first slot or position (Slot 0) 605, the stored MAC value being presumed to be the MAC value calculated over a full cacheline with a particular known special value inserted into one of the slots of the cacheline.

In some embodiments, the process proceeds with a trial and error process to reconstruct the cacheline by attempting to place the special value in each of the possible slots of the cacheline 610, starting with, for example, Slot 0. While for ease of illustration the example assumes that Slot 0 is attempted first, and then continuing through the remaining slots, embodiments are not limited to any particular order of calculation. The process then continues with recomputing the MAC value for the cacheline (i.e., calculating a new MAC value) over the cacheline assuming that the special value is located in the current slot 615, such as the example of Slot 0.

A determination is made whether the stored MAC (obtained from the cacheline) matches the newly computed cacheline 620. If so, the cacheline has been reconstructed, and the cacheline plaintext (including the special value in the current slot in this instance) may be sent to the processor cache (or to another location in other embodiments) 625.

If the stored MAC does not equal the computed MAC 620, then the current attempt at reconstruction of the cacheline has not been successful. There is then a determination whether all slots of the cacheline have been attempted 630. If not, a next slot in the cacheline is attempted, and the MAC is recomputed assuming the special value is located the next slot 635. The process then would continue with determination whether the stored MAC equals the newly calculated MAC 620. In some embodiments, to further improve performance, all the MAC calculations may be computed in parallel (rather than sequentially) using parallel and/or pipelined hardware to compute SHA3 KMAC values or similar.

If all slots have been attempted 630, then the data value for Slot 0 is loaded from memory (and decrypted, if necessary), and the MAC is computed with this data value appended to the plaintext of the cacheline 640. This circumstance would have occurred if the special value was not present in the original cacheline, as provided in element 525 of FIG. 5. There is then a determination whether the stored MAC matches the newly computed MAC 645. If so, the cacheline has been reconstructed, and the cacheline plaintext (including the data value from the table for Slot 0 in this instance) may be sent to the processor cache 625.

If the stored MAC does not match the newly computed MAC 645, then there is an issue regarding the cacheline value, and an integrity error is reported 650, which may include, for example, setting a poison bit in the cacheline.

While not illustrated in FIG. 6, is noted that if a reserved MAC value is stored, such as illustrated as element 545 in FIG. 5, then this would be verified by reading the actual MAC separately from a table in memory.

It is noted that alternative embodiments may be implemented in which multiple values may be the special value and all combinations of all possible values in all possible locations can be tried to reconstruct a cacheline. A histogram for determining the most common values may be used to create a dictionary of special values for this purpose at runtime specialized for a machine or workload, or precomputed ahead of time.

In some embodiments, heuristics may be included such that not all possible value locations are tried, just the most probable locations for the special value. In this way the MAC strength is not reduced by trying all possible combinations, but by only trying the most likely combinations of values and locations. In one example, if a zero byte value typically follows other zero byte values, then the replacement special value (or values) would only be attempted in slots that follow slots containing zero bytes.

In some embodiments, the cacheline itself may represent potential special values, as some word or byte sequences may repeat. The redundant entries may be removed, and the heuristic would try repeating values already in the cacheline at other positions to find a sequence that matches the original (stored) MAC value. Other embodiments may try repeated special values or sequences of special values across multiple smaller slots until enough slots can be removed and the remaining slots concentrated together to make space for the MAC. Embodiments may utilize a combination of slot sizes and special value sizes, with different pluralities until a message may be sufficiently compressed to fit the MAC value. Any combination of slot sizes, arrangements, and alignments is possible, limited by the performance considerations of the system (number of trial and error tests) and the required MAC strength. Other embodiments may utilize an additional hint value in addition to the MAC value, or a partial compression metadata, to improve the performance by eliminating the need for performing some of the trial and error sequences, with the MAC used to determine if any of the reduced set of message reconstruction alternatives is correct.

Figure 7:
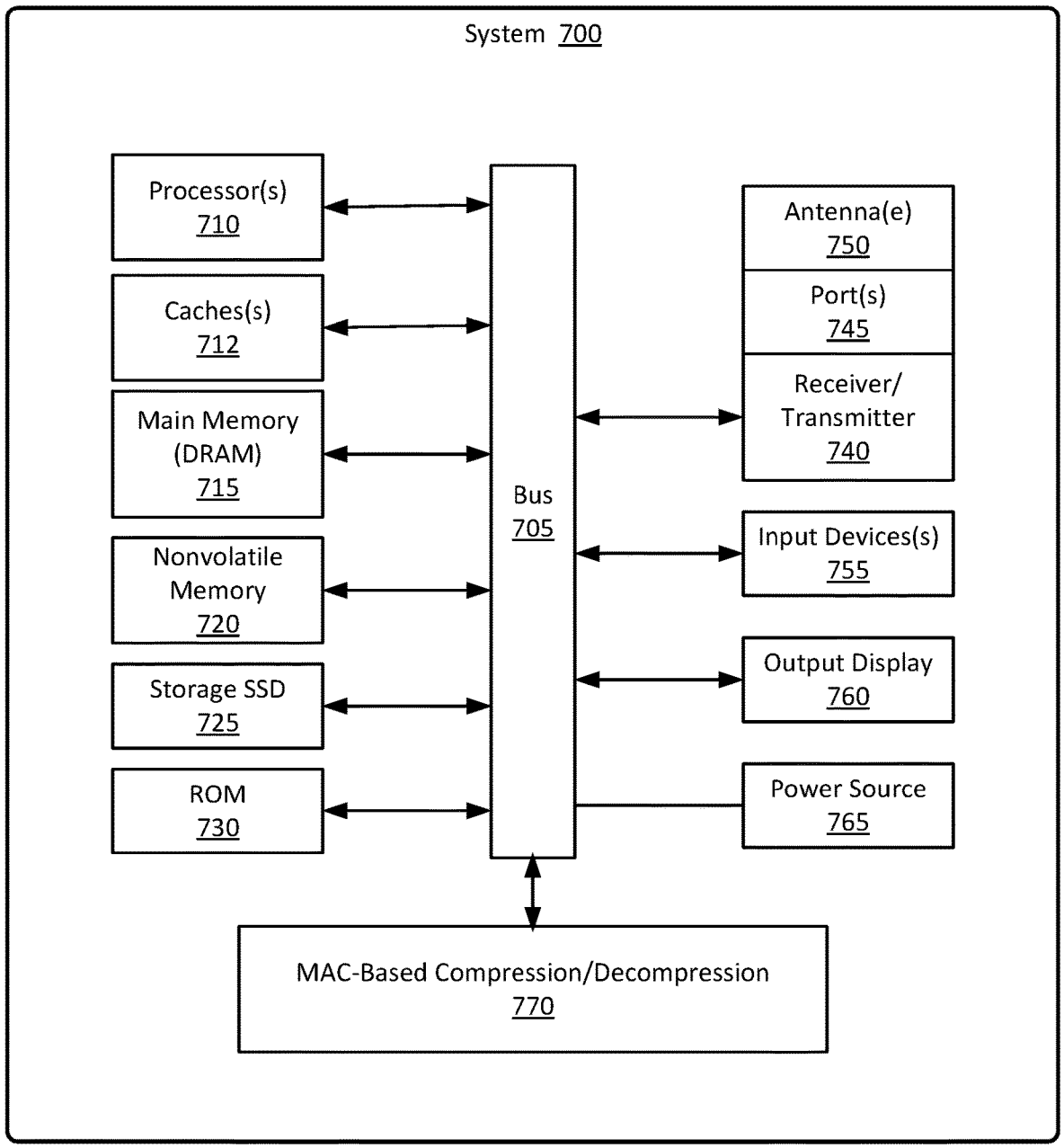
FIG. 7 is an illustration of a system to provide support for MAC-based compression, decompression, or both according to an embodiment.

FIG. 7 is an illustration of a system to provide support for MAC-based compression, decompression, or both according to an embodiment. In this illustration, certain standard and well-known components that are not germane to the present description are not shown. Elements shown as separate elements may be combined, including, for example, an SoC (System on Chip) or SoP (System on Package) combining multiple elements on a single chip or package.

In some embodiments, a system 700 includes MAC-based compression, decompression, or both 770 as illustrated in FIGS. 1-6.

The system 700 may further include a processing means such as one or more processors 710 coupled to one or more buses or interconnects, shown in general as bus 705. The processors 710 may comprise one or more physical processors and one or more logical processors. In some embodiments, the processors 710 may include one or more general-purpose processors or special-purpose processors, with each processor including one or more processing cores. The bus 705 is a communication means for transmission of data. The bus 705 is illustrated as a single bus for simplicity, but may represent multiple different interconnects or buses and the component connections to such interconnects or buses may vary. The bus 705 shown in FIG. 7 is an abstraction that represents any one or more separate physical buses, point-to-point connections, or both connected by appropriate bridges, adapters, or controllers.

In some embodiments, the system 700 further comprises one or more caches 712, which may include any level of caches (such as L1, L2, L3 caches), which may be either a part of one or more processors or may be external caches. The compression logic may be performed at any level of the cache hierarchy. The system 700 further includes a random access memory (RAM) or other dynamic storage device or element as a main memory 715 for storing information and instructions to be executed by the processors 710. Main memory 715 may include, but is not limited to, dynamic random access memory (DRAM). The system 700 also may comprise a non-volatile memory 720; a storage device such as a solid state drive (SSD) 725; and a read only memory (ROM) 730 or other static storage device for storing static information and instructions for the processors 710.

In some embodiments, the one or more processors 710 may utilize the MAC-based compression or decompression 770 to improve performance while maintaining security and integrity of data, such as data that is stored in either memory or caches, or that is transmitted externally.

In some embodiments, the system 700 includes one or more transmitters or receivers 740 coupled to the bus 705. In some embodiments, the system 700 may include one or more antennae 750, such as dipole or monopole antennae, for the transmission and reception of data via wireless communication using a wireless transmitter, receiver, or both, and one or more ports 745 for the transmission and reception of data via wired communications. Wireless communication includes, but is not limited to, Wi-Fi, Bluetooth™, near field communication, and other wireless communication standards. In some embodiments, a wired or wireless connection port is to link the RNIC 580 to a client system.

In some embodiments, system 700 includes one or more input devices 755 for the input of data, including hard and soft buttons, a joy stick, a mouse or other pointing device, a keyboard, voice command system, or gesture recognition system. In some embodiments, system 700 includes an output display 760, where the output display 760 may include a liquid crystal display (LCD) or any other display technology, for displaying information or content to a user. In some environments, the output display 760 may include a touch-screen that is also utilized as at least a part of an input device 755. Output display 760 may further include audio output, including one or more speakers, audio output jacks, or other audio, and other output to the user.

The system 700 may also comprise a battery or other power source 765, which may include a solar cell, a fuel cell, a charged capacitor, near field inductive coupling, or other system or device for providing or generating power in the system 700. The power provided by the power source 765 may be distributed as required to elements of the system 700.

In some embodiments, an apparatus includes one or more processors to process data; a computer memory; and one or more caches to store data for the one or more processors, wherein the one or more processors are to perform compression of a fixed transmission or storage unit, the transmission or storage unit including a plurality of slots, the compression of the transmission or storage unit including the one or more processors to: calculate a message authentication code (MAC) for data in the transmission or storage unit, determine whether a special value is present in any slot of the plurality of slots of the transmission or storage unit, and upon determining that the special value is present in a respective slot of the plurality of slots, remove the special value from the transmission or storage unit, shift remaining data of the transmission or storage unit to provide room in a first slot of the plurality of slots of the transmission or storage unit, and insert the MAC in the first slot to generate a modified transmission or storage unit.

In some embodiments, upon determining that the special value is not present in any of the slots of the transmission or storage unit, the one or more processors are further to remove data from the first slot of the plurality of slots, store the data from the first slot in a first table, and insert the MAC in the first slot.

In some embodiments, the one or more processors are further to determine whether a MAC collision can occur with the special value in a different slot than the respective slot containing the special value in the transmission or storage unit.

In some embodiments, upon the determining that a MAC collision can occur, the one or more processors are further to store a reserved value in place of the MAC in the transmission or storage unit, and store the MAC in a second table.

In some embodiments, one or more processors are further to encrypt the transmission or storage unit with the MAC.

In some embodiments, the one or more processors are further to perform decompression of the modified transmission or storage unit, the decompression of the modified transmission or storage unit including the one or more processors to: obtain a MAC value from the first slot of the modified transmission or storage unit; insert the special value in a slot of the modified transmission or storage unit and calculate a MAC for the modified transmission or storage unit including the special value; compare the MAC value obtained from the first slot of the modified transmission or storage unit to the calculated MAC for the modified transmission or storage unit including the special value; and upon determining that the MAC value from the first slot matches the calculated MAC for the modified transmission or storage unit including the special value, conclude that the transmission or storage unit has been reconstructed.

In some embodiments, upon determining that the MAC value from the first slot does not match the calculated MAC for the modified transmission or storage unit including the special value, the one or more processors to insert the special value in another slot of the modified transmission or storage unit, and repeat the calculation of the MAC and the comparison of the MAC value obtained from the first slot of the modified transmission or storage unit to the calculated MAC for the modified transmission or storage unit including the special value.

In some embodiments, upon determining that all slots of the plurality of slots of the modified transmission or storage unit have been attempted, the one or more processors to: load data from the first table into the first slot of the modified transmission or storage unit; calculate a MAC for the modified transmission or storage unit including the data from the first table; compare the MAC value obtained from the first slot of the modified transmission or storage unit to the calculated MAC for the modified transmission or storage unit including the data from the first table; and. upon determining that the MAC value from the first slot matches the calculated MAC for the modified transmission or storage unit including the data from the first table, conclude that the transmission or storage unit has been reconstructed.

In some embodiments, upon determining that the MAC value from the first slot does not match the calculated MAC for the modified transmission or storage unit including the data from the first table, report an integrity error for the transmission or storage unit.

In some embodiments, the apparatus further includes one or more caches to store data for the one or more processors, wherein the transmission or storage unit is a cacheline.

In some embodiments, one or more non-transitory computer-readable storage mediums having stored thereon executable computer program instructions that, when executed by one or more processors, cause the one or more processors to perform operations comprising calculating a message authentication code (MAC) for data in a fixed transmission or storage unit, the transmission or storage unit including a plurality of slots; determining whether a special value is present in any slot of the plurality of slots of the transmission or storage unit, and upon determining that the special value is present in a respective slot of the plurality of slots, removing the special value from the transmission or storage unit, shifting remaining data of the transmission or storage unit to provide room in a first slot of the plurality of slots of the transmission or storage unit, and inserting the MAC in the first slot to generate a modified transmission or storage unit.

In some embodiments, the instructions further include instructions for, upon determining that the special value is not present in any of the slots of the transmission or storage unit, removing data from the first slot of the plurality of slots, storing the data from the first slot in a first table, and inserting the MAC in the first slot.

In some embodiments, the instructions further include instructions for determining whether a MAC collision can occur with the special value in a different slot than the respective slot containing the special value in the transmission or storage unit.

In some embodiments, the instructions further include instructions for, upon determining that a MAC collision can occur, storing a reserved value in place of the MAC in the transmission or storage unit, and storing the MAC in a second table.

In some embodiments, the instructions further include instructions for encrypting the transmission or storage unit with the MAC.

In some embodiments, the instructions further include instructions for obtaining a MAC value from the first slot of the modified transmission or storage unit; inserting the special value in a slot of the modified transmission or storage unit and calculate a MAC for the modified transmission or storage unit including the special value; comparing the MAC value obtained from the first slot of the modified transmission or storage unit to the calculated MAC for the modified transmission or storage unit including the special value; and upon determining that the MAC value from the first slot matches the calculated MAC for the modified transmission or storage unit including the special value, concluding that the transmission or storage unit has been reconstructed.

In some embodiments, the instructions further include instructions for, upon determining that the MAC value from the first slot does not match the calculated MAC for the modified transmission or storage unit including the special value, inserting the special value in another slot of the modified transmission or storage unit and repeating the calculation of the MAC and the comparison of the MAC value obtained from the first slot of the modified transmission or storage unit to the calculated MAC for the modified transmission or storage unit including the special value.

In some embodiments, the instructions further include instructions for, upon determining that all slots of the plurality of slots of the modified transmission or storage unit have been attempted: loading data from the first table into the first slot of the modified transmission or storage unit; calculating a MAC for the modified transmission or storage unit including the data from the first table; comparing the MAC value obtained from the first slot of the modified transmission or storage unit to the calculated MAC for the modified transmission or storage unit including the data from the first table; and upon determining that the MAC value from the first slot matches the calculated MAC for the modified transmission or storage unit including the data from the first table, concluding that the transmission or storage unit has been reconstructed.

In some embodiments, the instructions further include instructions for, upon determining that the MAC value from the first slot does not match the calculated MAC for the modified transmission or storage unit including the data from the first table, reporting an integrity error for the transmission or storage unit.

In some embodiments, a method includes calculating a message authentication code (MAC) for data in a fixed transmission or storage unit, the transmission or storage unit including a plurality of slots; determining whether a special value is present in any slot of the plurality of slots of the transmission or storage unit, and upon determining that the special value is present in a respective slot of the plurality of slots, removing the special value from the transmission or storage unit, shifting remaining data of the transmission or storage unit to provide room in a first slot of the plurality of slots of the transmission or storage unit, and inserting the MAC in the first slot to generate a modified transmission or storage unit.

In some embodiments, the method further includes, upon determining that the special value is not present in any of the slots of the transmission or storage unit, removing data from the first slot of the plurality of slots, storing the data from the first slot in a first table, and inserting the MAC in the first slot.

In some embodiments, the method further includes obtaining a MAC value from the first slot of the modified transmission or storage unit; inserting the special value in a slot of the modified transmission or storage unit and calculate a MAC for the modified transmission or storage unit including the special value; comparing the MAC value obtained from the first slot of the modified transmission or storage unit to the calculated MAC for the modified transmission or storage unit including the special value; and upon determining that the MAC value from the first slot matches the calculated MAC for the modified transmission or storage unit including the special value, concluding that the transmission or storage unit has been reconstructed.

In some embodiments, the method further includes, upon determining that the MAC value from the first slot does not match the calculated MAC for the modified transmission or storage unit including the special value, inserting the special value in another slot of the modified transmission or storage unit and repeating the calculation of the MAC and the comparison of the MAC value obtained from the first slot of the modified transmission or storage unit to the calculated MAC for the modified transmission or storage unit including the special value.

In some embodiments, the method further includes, upon determining that all slots of the plurality of slots of the modified transmission or storage unit have been attempted: loading data from the first table into the first slot of the modified transmission or storage unit; calculating a MAC for the modified transmission or storage unit including the data from the first table; comparing the MAC value obtained from the first slot of the modified transmission or storage unit to the calculated MAC for the modified transmission or storage unit including the data from the first table; and upon determining that the MAC value from the first slot matches the calculated MAC for the modified transmission or storage unit including the data from the first table, concluding that the transmission or storage unit has been reconstructed.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus comprising:
one or more processors to process data; and
a computer memory;
wherein the one or more processors are to perform compression of a fixed transmission or storage unit including a plurality of slots, the compression of the transmission or storage unit including the one or more processors to:
calculate a message authentication code (MAC) for data in the transmission or storage unit,
determine whether a special value is present in any slot of the plurality of slots of the transmission or storage unit, the special value having a certain value and having a size equal to a size of a slot of the plurality of slots,
upon determining that the special value is present in a respective slot of the plurality of slots, remove the special value from the transmission or storage unit, shift remaining data of the transmission or storage unit to provide room in a first slot of the plurality of slots, and insert the MAC in the first slot to generate a modified transmission or storage unit, and
upon determining that the special value is not present in any of the slots of the transmission or storage unit, remove data from the first slot of the plurality of slots, store the data from the first slot in a first table, and insert the MAC in the first slot.

2. The apparatus of claim 1, wherein the one or more processors are further to determine whether a MAC collision can occur with the special value in a different slot than the respective slot containing the special value in the transmission or storage unit.

3. The apparatus of claim 2, wherein upon the determining that a MAC collision can occur, the one or more processors are further to store a reserved value in place of the MAC in the transmission or storage unit, and store the MAC in a second table.

4. The apparatus of claim 1, wherein one or more processors are further to encrypt the transmission or storage unit with the MAC.

5. The apparatus of claim 1, wherein the one or more processors are further to perform decompression of the modified transmission or storage unit, the decompression of the modified transmission or storage unit including the one or more processors to:
obtain a MAC value from the first slot of the modified transmission or storage unit;
insert the special value in a slot of the modified transmission or storage unit and calculate a MAC for the modified transmission or storage unit including the special value;
compare the MAC value obtained from the first slot of the modified transmission or storage unit to the calculated MAC for the modified transmission or storage unit including the special value; and
upon determining that the MAC value from the first slot matches the calculated MAC for the modified transmission or storage unit including the special value, conclude that the transmission or storage unit has been reconstructed.

6. The apparatus of claim 5, wherein, upon determining that the MAC value from the first slot does not match the calculated MAC for the modified transmission or storage unit including the special value, the one or more processors to insert the special value in another slot of the modified transmission or storage unit, and repeat the calculation of the MAC and the comparison of the MAC value obtained from the first slot of the modified transmission or storage unit to the calculated MAC for the modified transmission or storage unit including the special value.

7. The apparatus of claim 6, wherein, upon the determining that all slots of the plurality of slots of the modified transmission or storage unit have been attempted, the one or more processors to:
load data from the first table into the first slot of the modified transmission or storage unit;
calculate a MAC for the modified transmission or storage unit including the data from the first table;
compare the MAC value obtained from the first slot of the modified transmission or storage unit to the calculated MAC for the modified transmission or storage unit including the data from the first table; and
upon determining that the MAC value from the first slot matches the calculated MAC for the modified transmission or storage unit including the data from the first table, conclude that the transmission or storage unit has been reconstructed.

8. The apparatus of claim 7, wherein, upon determining that the MAC value from the first slot does not match the calculated MAC for the modified transmission or storage unit including the data from the first table, report an integrity error for the transmission or storage unit.

9. The apparatus of claim 1, further comprising one or more caches to store data for the one or more processors, wherein the transmission or storage unit is a cacheline.

10. One or more non-transitory computer-readable storage mediums having stored thereon executable computer program instructions that, when executed by one or more processors, cause the one or more processors to perform operations comprising:
performing compression of a fixed transmission or storage unit including a plurality of slots, the compression of the transmission or storage unit including:
calculating a message authentication code (MAC) for data in the fixed transmission or storage unit, the transmission or storage unit including a plurality of slots;
determining whether a special value is present in any slot of the plurality of slots of the transmission or storage unit, the special value having a certain value and having a size equal to a size of a slot of the plurality of slots;
upon determining that the special value is present in a respective slot of the plurality of slots, removing the special value from the transmission or storage unit, shifting remaining data of the transmission or storage unit to provide room in a first slot of the plurality of slots of the transmission or storage unit, and inserting the MAC in the first slot to generate a modified transmission or storage unit; and
upon determining that the special value is not present in any of the slots of the transmission or storage unit, removing data from the first slot of the plurality of slots, storing the data from the first slot in a first table, and inserting the MAC in the first slot.

11. The one or more mediums of claim 10, further comprising executable computer program instructions that, when executed by the one or more processors, cause the one or more processors to perform operations comprising:
determining whether a MAC collision can occur with the special value in a different slot than the respective slot containing the special value in the transmission or storage unit.

12. The one or more mediums of claim 11, further comprising executable computer program instructions that, when executed by the one or more processors, cause the one or more processors to perform operations comprising:
upon determining that a MAC collision can occur, storing a reserved value in place of the MAC in the transmission or storage unit, and storing the MAC in a second table.

13. The one or more mediums of claim 10, further comprising executable computer program instructions that, when executed by the one or more processors, cause the one or more processors to perform operations comprising:
encrypting the transmission or storage unit with the MAC.

14. The one or more mediums of claim 10, further comprising executable computer program instructions that, when executed by the one or more processors, cause the one or more processors to perform operations comprising:
performing decompression of the modified transmission or storage unit, the decompression of the modified transmission or storage unit including:
obtaining a MAC value from the first slot of the modified transmission or storage unit;
inserting the special value in a slot of the modified transmission or storage unit and calculate a MAC for the modified transmission or storage unit including the special value;
comparing the MAC value obtained from the first slot of the modified transmission or storage unit to the calculated MAC for the modified transmission or storage unit including the special value; and
upon determining that the MAC value from the first slot matches the calculated MAC for the modified transmission or storage unit including the special value, concluding that the transmission or storage unit has been reconstructed.

15. The one or more mediums of claim 14, further comprising executable computer program instructions that, when executed by the one or more processors, cause the one or more processors to perform operations comprising:

upon determining that the MAC value from the first slot does not match the calculated MAC for the modified transmission or storage unit including the special value, inserting the special value in another slot of the modified transmission or storage unit and repeating the calculation of the MAC and the comparison of the MAC value obtained from the first slot of the modified transmission or storage unit to the calculated MAC for the modified transmission or storage unit including the special value.

16. The one or more mediums of claim 15, further comprising executable computer program instructions that, when executed by the one or more processors, cause the one or more processors to perform operations comprising:

upon determining that all slots of the plurality of slots of the modified transmission or storage unit have been attempted:
  loading data from the first table into the first slot of the modified transmission or storage unit;
  calculating a MAC for the modified transmission or storage unit including the data from the first table;
  comparing the MAC value obtained from the first slot of the modified transmission or storage unit to the calculated MAC for the modified transmission or storage unit including the data from the first table; and
  upon determining that the MAC value from the first slot matches the calculated MAC for the modified transmission or storage unit including the data from the first table, concluding that the transmission or storage unit has been reconstructed.

17. The one or more mediums of claim 16, further comprising executable computer program instructions that, when executed by the one or more processors, cause the one or more processors to perform operations comprising:

upon determining that the MAC value from the first slot does not match the calculated MAC for the modified transmission or storage unit including the data from the first table, reporting an integrity error for the transmission or storage unit.

18. A method comprising:
performing compression of a fixed transmission or storage unit including a plurality of slots, the compression of the transmission or storage unit including:
  calculating a message authentication code (MAC) for data in the fixed transmission or storage unit, the transmission or storage unit including a plurality of slots;
  determining whether a special value is present in any slot of the plurality of slots of the transmission or storage unit, the special value having a certain value and having a size equal to a size of a slot of the plurality of slots;
  upon determining that the special value is present in a respective slot of the plurality of slots, removing the special value from the transmission or storage unit, shifting remaining data of the transmission or storage unit to provide room in a first slot of the plurality of slots of the transmission or storage unit, and inserting the MAC in the first slot to generate a modified transmission or storage unit; and
  upon determining that the special value is not present in any of the slots of the transmission or storage unit, removing data from the first slot of the plurality of slots, storing the data from the first slot in a first table, and inserting the MAC in the first slot.

19. The method of claim 18, further comprising:
performing decompression of the modified transmission or storage unit, the decompression of the modified transmission or storage unit including:
  obtaining a MAC value from the first slot of the modified transmission or storage unit;
  inserting the special value in a slot of the modified transmission or storage unit and calculate a MAC for the modified transmission or storage unit including the special value;
  comparing the MAC value obtained from the first slot of the modified transmission or storage unit to the calculated MAC for the modified transmission or storage unit including the special value; and
  upon determining that the MAC value from the first slot matches the calculated MAC for the modified transmission or storage unit including the special value, concluding that the transmission or storage unit has been reconstructed.

20. The method of claim 19, further comprising:
upon determining that the MAC value from the first slot does not match the calculated MAC for the modified transmission or storage unit including the special value, inserting the special value in another slot of the modified transmission or storage unit and repeating the calculation of the MAC and the comparison of the MAC value obtained from the first slot of the modified transmission or storage unit to the calculated MAC for the modified transmission or storage unit including the special value.

21. The method of claim 20, further comprising:
upon determining that all slots of the plurality of slots of the modified transmission or storage unit have been attempted:
  loading data from the first table into the first slot of the modified transmission or storage unit;
  calculating a MAC for the modified transmission or storage unit including the data from the first table;
  comparing the MAC value obtained from the first slot of the modified transmission or storage unit to the calculated MAC for the modified transmission or storage unit including the data from the first table; and
  upon determining that the MAC value from the first slot matches the calculated MAC for the modified transmission or storage unit including the data from the first table, concluding that the transmission or storage unit has been reconstructed.

* * * * *